(12) United States Patent
Bullock et al.

(10) Patent No.: US 6,886,950 B1
(45) Date of Patent: May 3, 2005

(54) GLARE REDUCTION REAR VIEW MIRROR ASSEMBLY

(76) Inventors: Breck Bullock, 6898 A Coltrane Mill Rd., Greensboro, NC (US) 27406; Lynwood Bullock, 6898 A Coltrane Mill Rd., Greensboro, NC (US) 27406

( * ) Notice: Subject to any disclaimer, the term of this patent is extended or adjusted under 35 U.S.C. 154(b) by 0 days.

(21) Appl. No.: 10/823,903

(22) Filed: Apr. 15, 2004

(51) Int. Cl.[7] .......................... G02B 17/00; G02B 7/182
(52) U.S. Cl. .................. 359/605; 359/601; 359/877
(58) Field of Search ................. 359/601–614, 359/871–879, 838–889

(56) References Cited

U.S. PATENT DOCUMENTS

| | | | | |
|---|---|---|---|---|
| 3,495,896 A | * | 2/1970 | Barcus et al. ............... | 359/606 |
| 3,836,235 A | * | 9/1974 | Russell ....................... | 359/605 |
| 4,281,898 A | * | 8/1981 | Ochiai et al. ............... | 359/606 |
| 4,371,235 A | * | 2/1983 | Locke, Sr. .................. | 359/605 |
| 4,448,488 A | * | 5/1984 | Nakaho ....................... | 359/606 |
| 4,502,759 A | * | 3/1985 | Herzog et al. .............. | 359/876 |
| 4,571,027 A | * | 2/1986 | Klein .......................... | 359/606 |
| 4,679,906 A | * | 7/1987 | Brandenburg ............... | 359/606 |

FOREIGN PATENT DOCUMENTS

EP      202 757 A2 * 11/1986 ................. 359/606

* cited by examiner

*Primary Examiner*—Thong Q Nguyen

(57) ABSTRACT

A glare reduction rear view mirror assembly for eliminating the glare from the headlights of vehicles coming up from behind the user's vehicle. The glare reduction rear view mirror assembly includes a frame having back, top, bottom, and side walls, and also having an open front; and also includes bracket members being attached to the frame and being adapted to fasten to a vehicle; and further includes a transparent pane being disposed over the open front of the frame; and also includes a mirror pane being pivotally disposed in the frame behind the transparent pane; and further includes an assembly for pivoting the mirror pane longitudinally.

4 Claims, 6 Drawing Sheets

GLARE REDUCTION REAR VIEW MIRROR ASSEMBLY

BACKGROUND OF THE INVENTION

1. Field of the Invention

The present invention relates to glare-reducing rear view mirrors and more particularly pertains to a new glare reduction rear view mirror assembly for eliminating the glare from the headlights of vehicles coming up from behind the user's vehicle.

2. Description of the Prior Art

The use of glare-reducing rear view mirrors is known in the prior art. More specifically, glare-reducing rear view mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,170,957; U.S. Pat. No. 5,993,013; U.S. Pat. No. 5,798,881; U.S. Pat. No. 3,574,446; U.S. Pat. No. 3,722,984; and U.S. Pat. No. Des. 220,097.

While these devices fulfill their respective, particular objectives and requirements, the aforementioned patents do not disclose a new glare reduction rear view mirror assembly.

SUMMARY OF THE INVENTION

The general purpose of the present invention, which will be described subsequently in greater detail, is to provide a new glare reduction rear view mirror assembly which has many of the advantages of the glare-reducing rear view mirrors mentioned heretofore and many novel features that result in a new glare reduction rear view mirror assembly which is not anticipated, rendered obvious, suggested, or even implied by any of the prior art glare-reducing rear view mirrors, either alone or in any combination thereof. The present invention includes a frame having back, top, bottom, and side walls, and also having an open front; and also includes bracket members being attached to the frame and being adapted to fasten to a vehicle; and further includes a transparent pane being disposed over the open front of the frame; and also includes a mirror pane being pivotally disposed in the frame behind the transparent pane; and further includes an assembly for pivoting the mirror pane longitudinally.

There has thus been outlined, rather broadly, the more important features of the glare reduction rear view mirror assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new glare reduction rear view mirror assembly which has many of the advantages of the glare-reducing rear view mirrors mentioned heretofore and many novel features that result in a new glare reduction rear view mirror assembly which is not anticipated, rendered obvious, suggested, or even implied by any of the prior art glare-reducing rear view mirrors, either alone or in any combination thereof.

Still another object of the present invention is to provide a new glare reduction rear view mirror assembly for eliminating the glare from the headlights of vehicles coming up from behind the user's vehicle.

Still yet another object of the present invention is to provide a new glare reduction rear view mirror assembly that is easy and convenient to use.

Even still another object of the present invention is to provide a new glare reduction rear view mirror assembly that increases safety on the road because the user won't become blinded by the glare of the headlights of the trailing vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
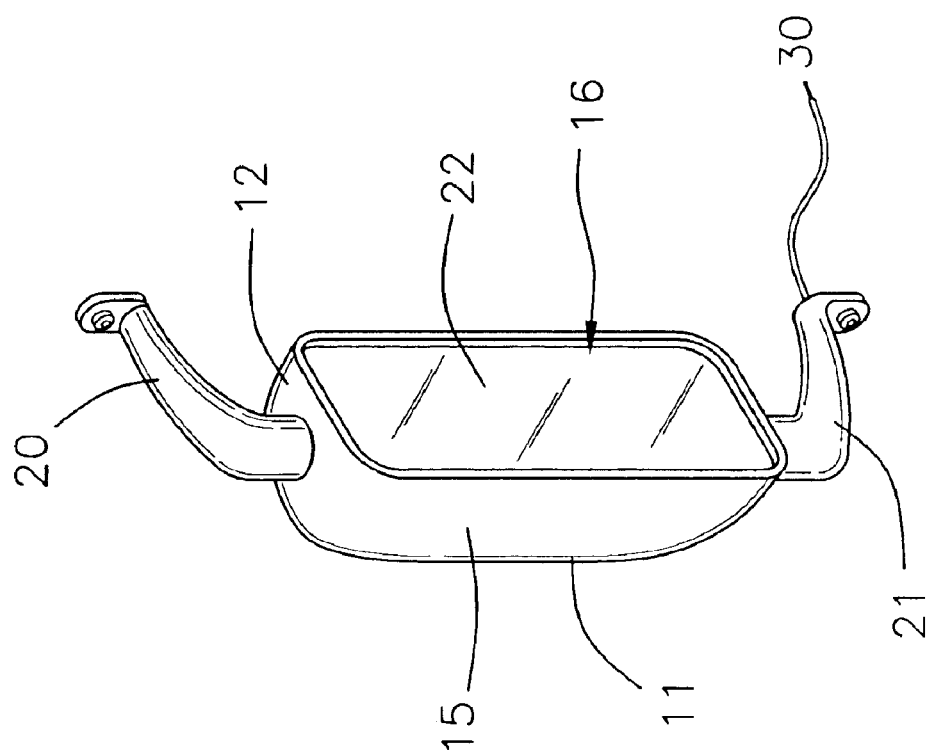
FIG. 1 is a perspective view of a new glare reduction rear view mirror assembly according to the present invention.
Figure 2:
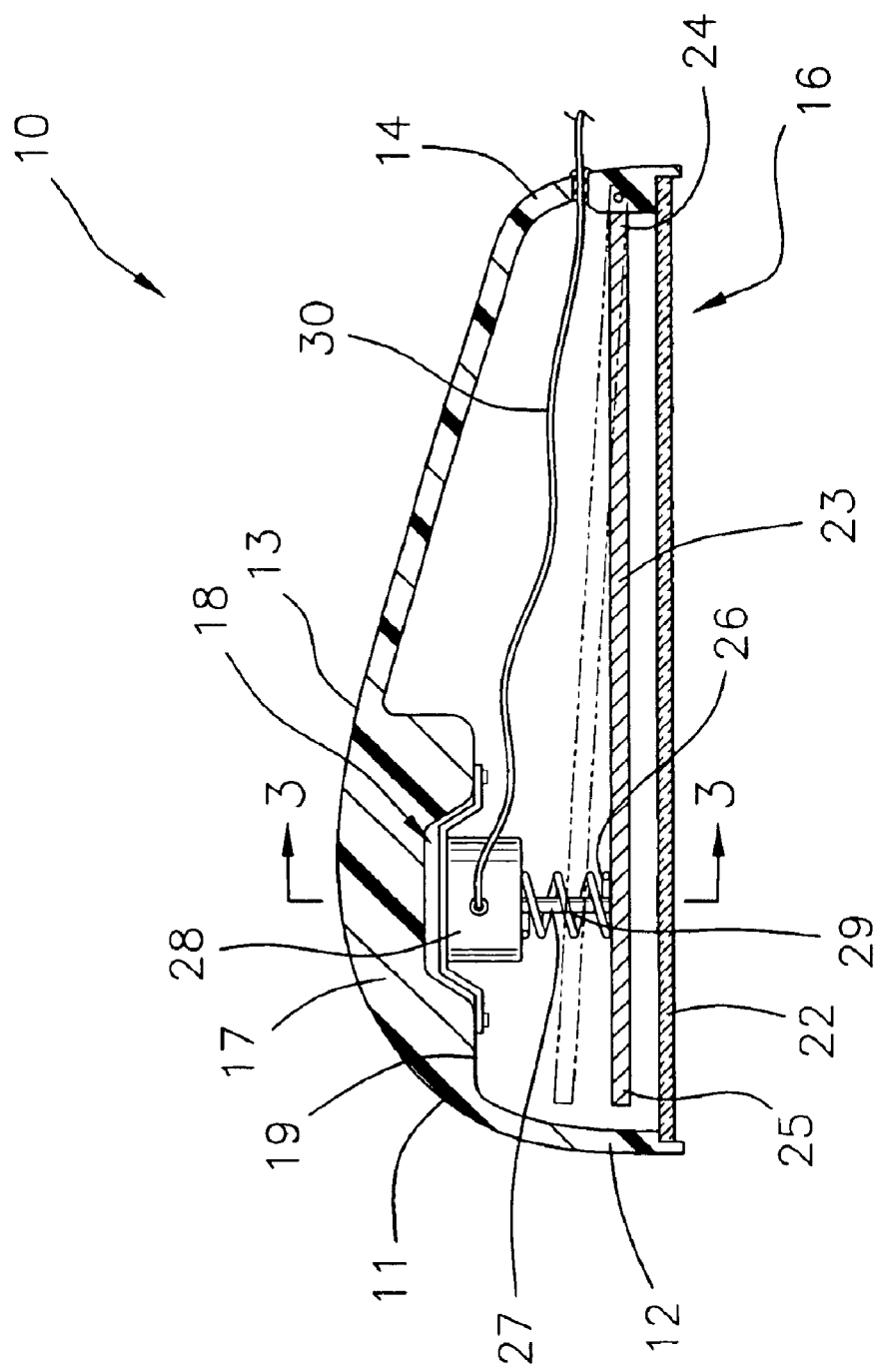
FIG. 2 is a cross-sectional view of the present invention.
Figure 3:
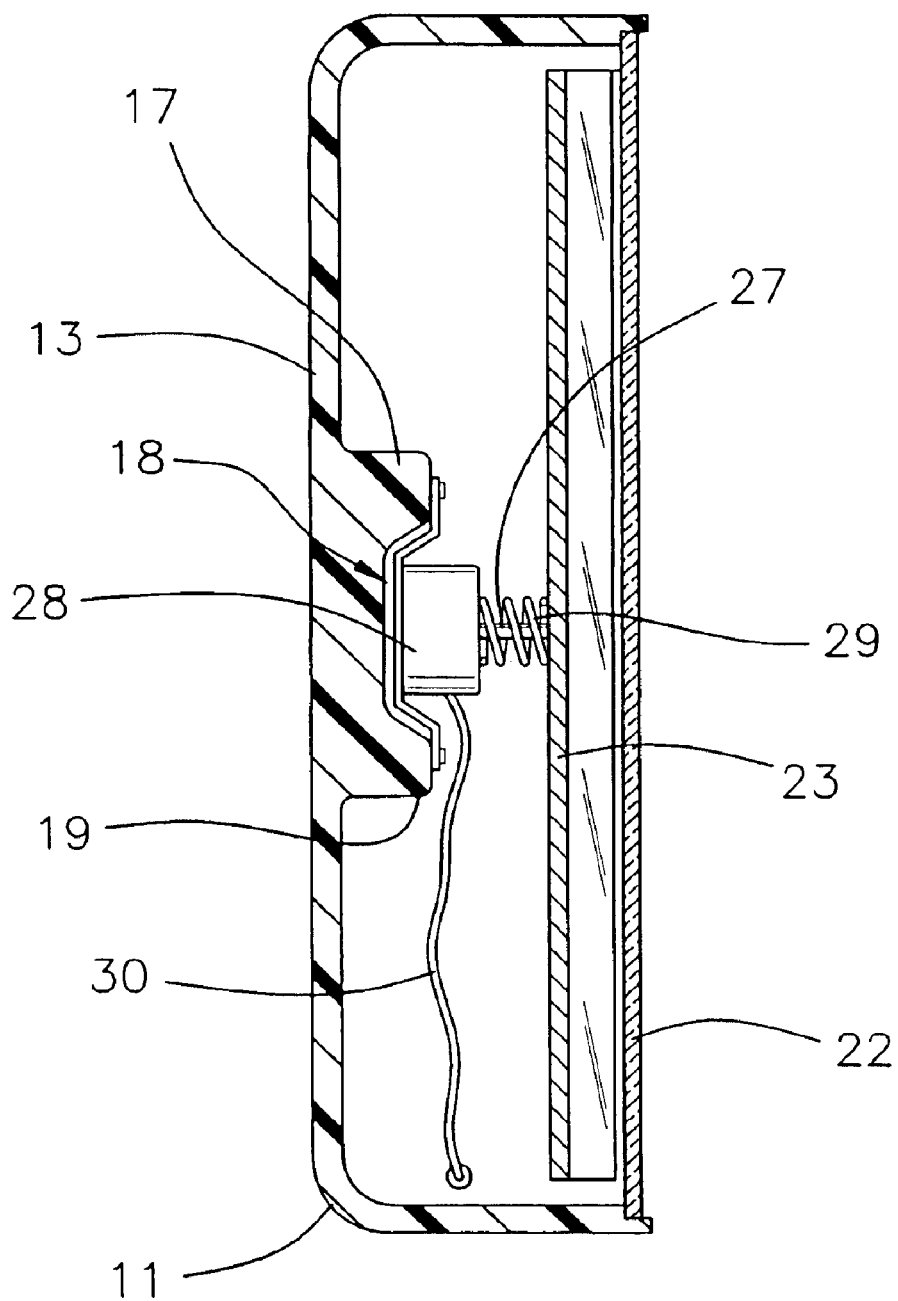
FIG. 3 is a cross-sectional view of a second embodiment of the present invention.
Figure 4:
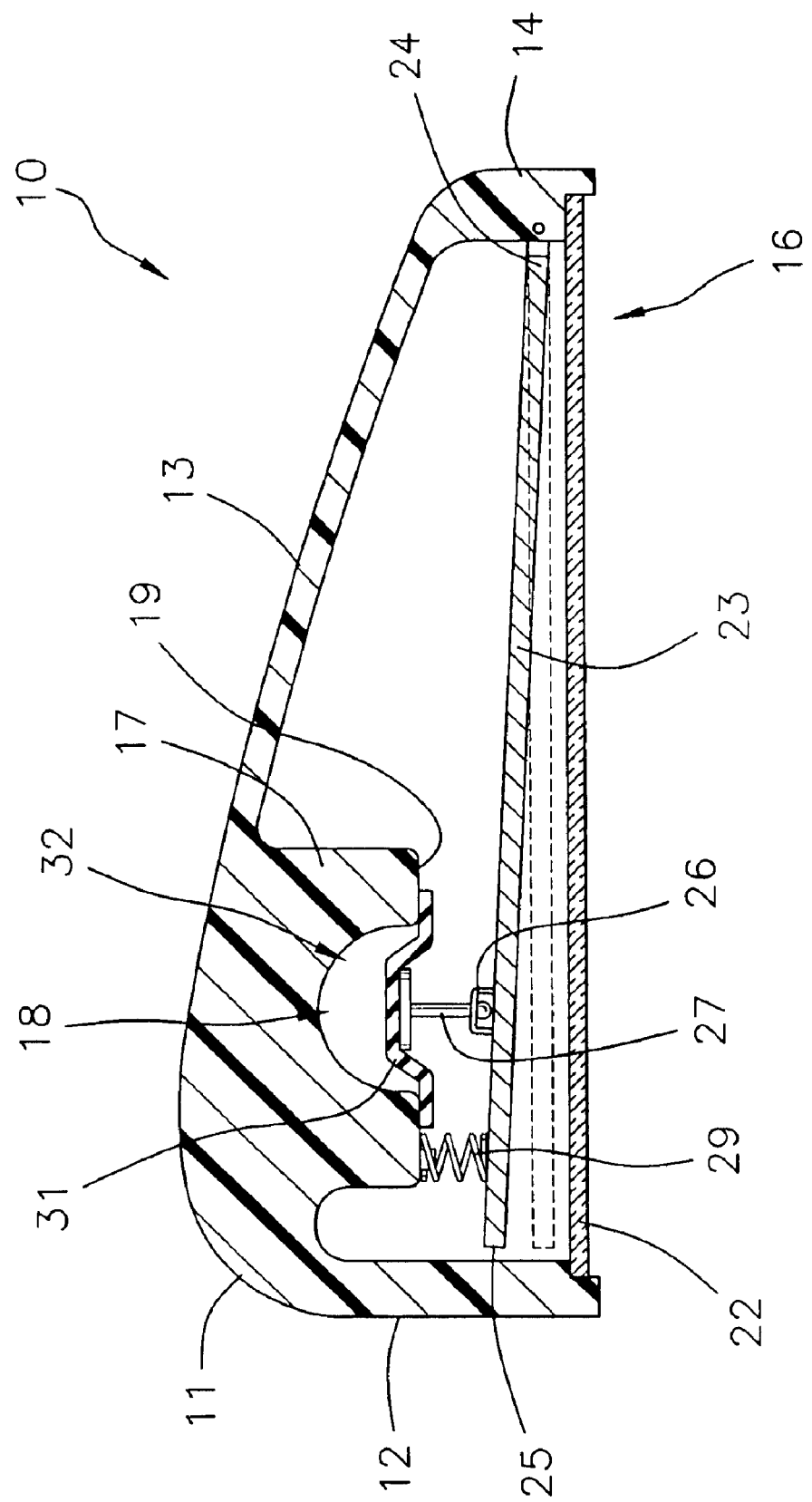
FIG. 4 is a cross-sectional view of a third embodiment of the present invention.
Figure 5:
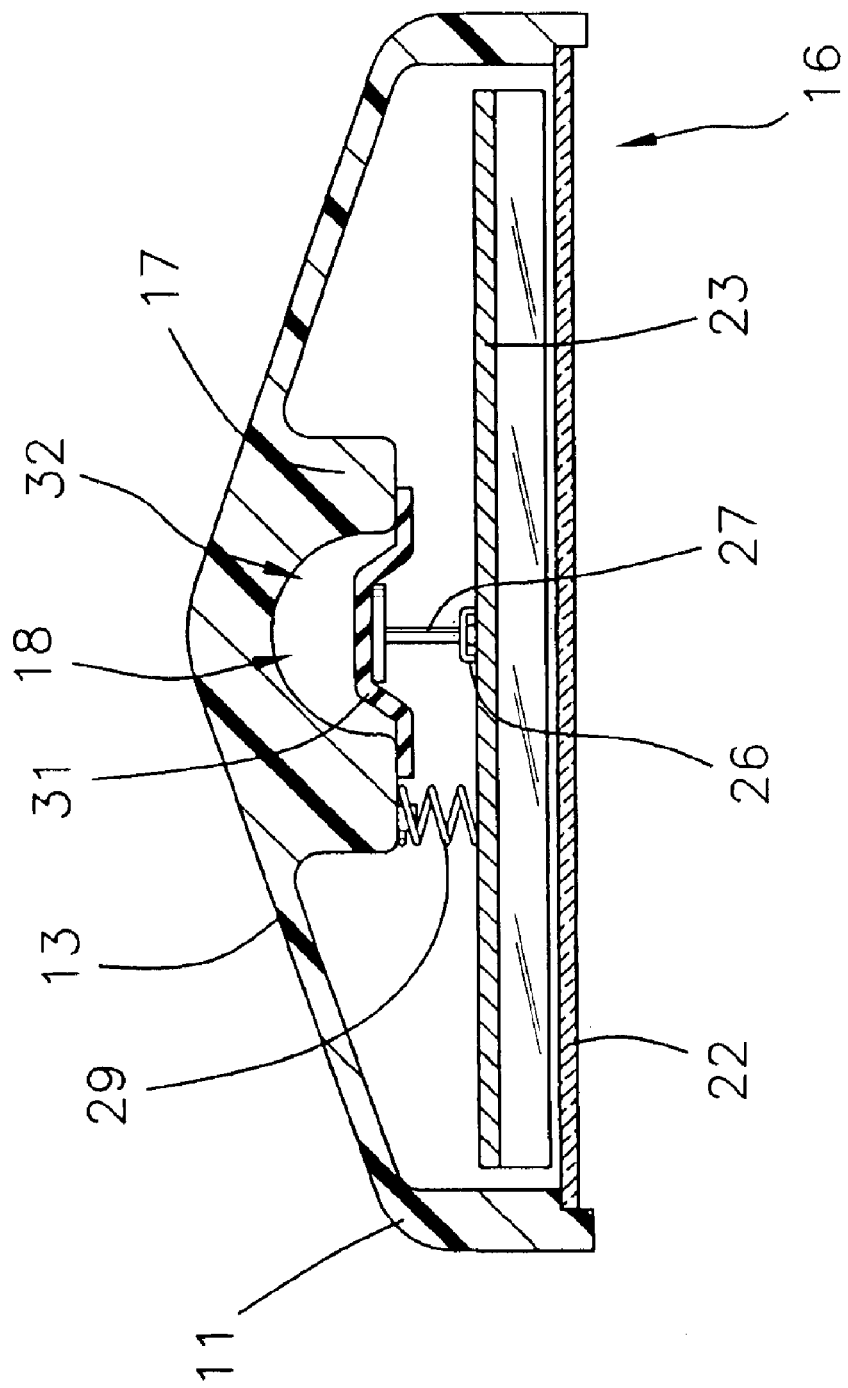
FIG. 5 is a cross-sectional view of a fourth embodiment of the present invention.
Figure 6:
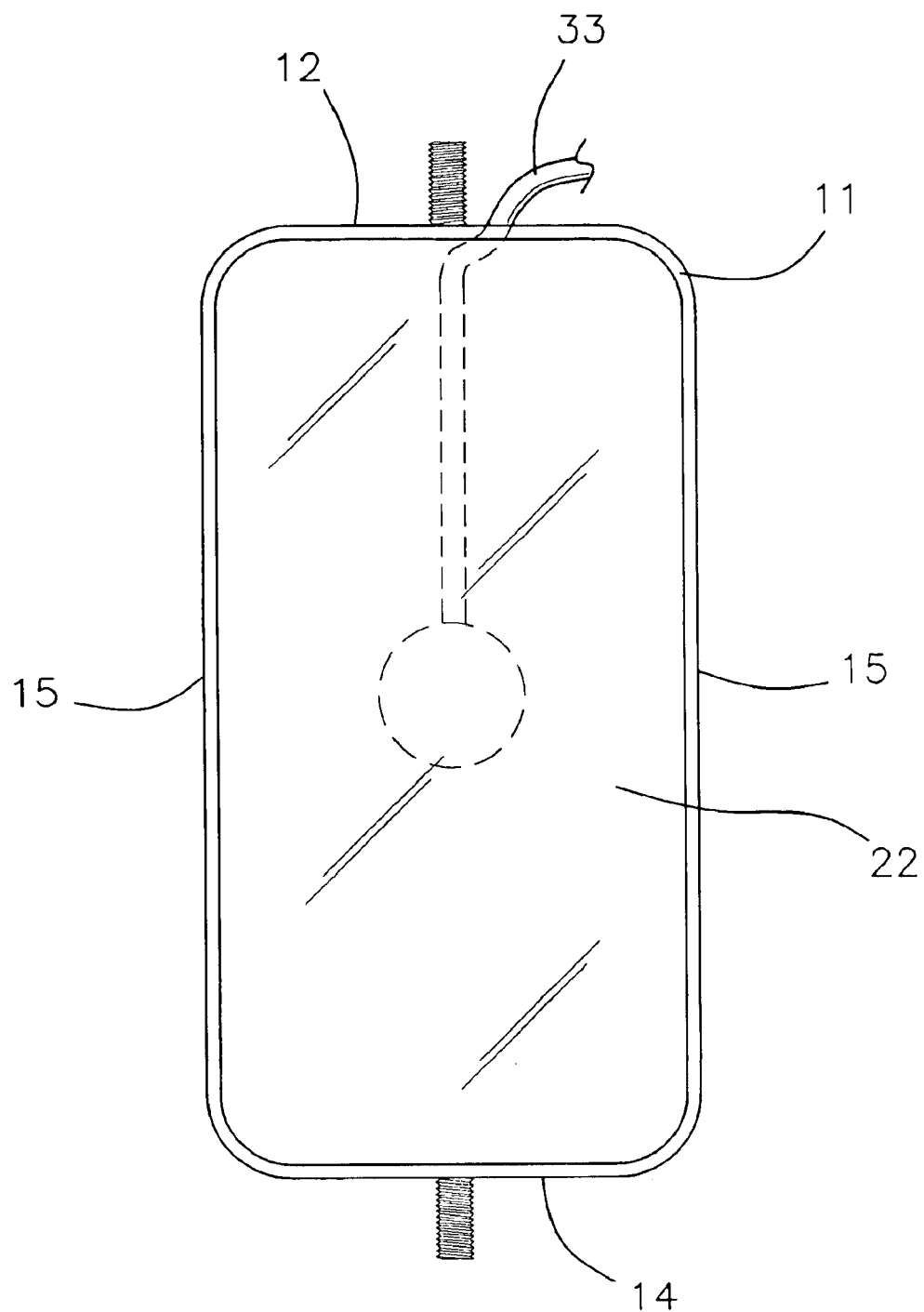
FIG. 6 is a front elevational view of the present invention.

With reference now to the drawings, and in particular to FIGS. 1 through 6 thereof, a new glare reduction rear view mirror assembly embodying the principles and concepts of the present invention and generally designated by the reference numeral 10 will be described.

As best illustrated in FIGS. 1 through 6, the glare reduction rear view mirror assembly 10 generally comprises a frame 11 having back, top, bottom, and side walls 12–15, and also having an open front 16. The back wall 13 of the frame is slanted inwardly from the top wall 12 to the bottom wall 14 thereof for effecting an aerodynamic appearance. The frame 11 further includes a support body 17 being integrally attached to an inner side of the back wall 13 and near the top wall 12 of the frame 11 and protruding forwardly of the back wall 13 and having a recessed portion 18 disposed in a front side 19 thereof. Bracket members 20,21 are conventionally attached to the frame 11 and are adapted to fasten to a vehicle. A transparent pane 22 such as glass is conventionally attached to and disposed over the open front 16 of the frame 11.

A mirror pane 23 is pivotally and conventionally disposed in the frame 11 behind the transparent pane 22. The mirror pane 23 is pivotally attached at a bottom end 24 thereof to the bottom wall 14 of the frame 11 with a top end 25 of the mirror pane 23 being capable of moving forwardly and rearwardly in the frame 11 to effectively re-impose an image displayed in the mirror pane 23 upon the transparent pane 22.

A means for pivoting the mirror pane 23 longitudinally includes a bracket 26 being conventionally attached to a back side of the mirror pane 23 near the top end 25 thereof, and also includes a drive member 27 such as a shaft being pivotally and conventionally attached to the bracket 26, and further includes an actuator 28,31 being conventionally attached over the recessed portion 18 of the support body 17 and being conventionally attached to the drive member 27, and also includes a spring member 29 being conventionally disposed between the support body 17 and the mirror pane 23 for biasing the top end 25 of the mirror pane 23 toward the transparent pane 22. The actuator is a solenoid 28 being conventionally attached with a mounting bracket to the support body 17, and also being conventionally attached to the drive member 27 for urging the top end 25 of the mirror pane 23 away from the transparent pane 22, and further being conventionally connected with wires 30 to a switch for the energizing thereof.

As a second embodiment, the actuator is a flexible diaphragm 31 being in contactable relationship to the drive member 27 for urging the top end 25 of the mirror pane 23 away from the transparent pane 22. The flexible diaphragm 31 covers the recessed portion 18 in the support body 17 thus creating an air chamber 32 in the recessed portion 18. The means for pivoting the mirror pane 23 longitudinally also includes an air hose 33 being in air communication to the air chamber 32 and being adapted to be connected to an air suction device for removing air from the air chamber 32 which urges the flexible diaphragm 31 inwardly of the air chamber 32 thus causing the drive member 27 to move the top end 25 of the mirror pane 23 away from the transparent pane 22.

In use, the user, when confronted with a vehicle shining one's lights into the mirror pane 23 and causing a glare, actuates the actuator 28,31 thus causing the drive member 27 to move the top end 25 of the mirror pane 23 away from the transparent pane 22 and transposing the image in the mirror pane 23 onto the transparent pane 22 thus filtering out the glare from the headlights of the trailing vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the glare reduction rear view mirror assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A glare reduction rear view mirror assembly comprising:

a frame having back, top, bottom, and side walls, and also having an open front, said back wall of said frame being slanted inwardly from said top wall to said bottom wall thereof for effecting an aerodynamic appearance, said frame further including a support body being attached to an inner side of said back wall and near said top wall of said frame and protruding forwardly of said back wall and having a recessed portion disposed in a front side thereof;

bracket members being attached to said frame and being adapted to fasten to a vehicle;

a transparent pane being disposed over said open front of said frame;

a mirror pane being pivotally disposed in said frame behind said transparent pane, said mirror pane being pivotally attached at a bottom end thereof to said bottom wall of said frame with a top end of said mirror pane capable of moving forwardly and rearwardly in said frame to effectively re-impose an image displayed in said mirror pane upon said transparent pane; and a means for pivoting said mirror pane longitudinally includes including a bracket being attached to a back side of said mirror pane near said top end thereof, and also including a drive member being pivotally attached to said bracket, and further including an actuator being attached over said recessed portion of said support body and being attached to said drive member, and also including a spring member being disposed between said support body and said mirror pane for biasing said top end of said mirror pane toward said transparent pane.

2. A glare reduction rear view mirror assembly as described in claim 1, wherein said actuator is a solenoid being attached with a mounting bracket to said support body, and also being attached to said drive member for urging said top end of said mirror pane away from said transparent pane, and further being connected with wires to a switch for the energizing thereof.

3. A glare reduction rear view mirror assembly as described in claim 1, wherein said actuator is a flexible diaphragm being in contactable relationship to said drive member for urging said top end of said mirror pane away from said transparent pane, said flexible diaphragm covering said recessed portion in said support body thus creating an air chamber in said recessed portion.

4. A glare reduction rear view mirror assembly as described in claim 3, wherein said means for pivoting said mirror pane longitudinally also includes an air hose being in air communication to said air chamber and being adapted to be connected to an air suction device for removing air from said air chamber which urges said flexible diaphragm inwardly of said air chamber thus causing said drive member to move said top end of said mirror pane away from said transparent pane.

* * * * *